C. J. COLEMAN.
PHOTOGRAPHIC FILM.
APPLICATION FILED APR. 1, 1912.
1,276,330.
Patented Aug. 20, 1918.
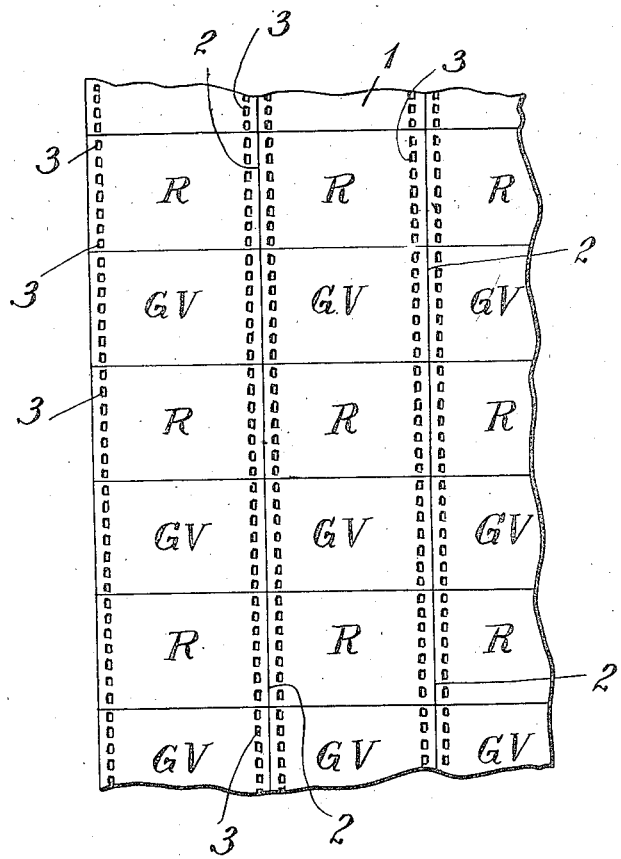
WITNESSES:
INVENTOR
Clyde J. Coleman
BY
Kenyon & Kenyon
ATTORNEYS

UNITED STATES PATENT OFFICE.

CLYDE J. COLEMAN, OF NEW YORK, N. Y.

PHOTOGRAPHIC FILM.

1,276,330.     Specification of Letters Patent.     Patented Aug. 20, 1918.

Application filed April 1, 1912. Serial No. 687,562.

*To all whom it may concern:*

Be it known that I, CLYDE J. COLEMAN, a citizen of the United States, and a resident of New York, county of New York, and State of New York, have invented certain new and useful Improvements in Photographic Films, of which the following is a specification.

My invention relates to improvements in the production of colored moving pictures, and more especially to an improved film whereby the different color values may be more accurately balanced or adjusted to more accurately represent the colors of the real objects.

One object of my invention is to do this with the various camera and projecting apparatus now or hereafter common without requiring any or any material change therein. Further objects, features and advantages will more clearly appear from the detailed description given below taken in connection with the accompanying drawing which forms a part of this specification.

The drawing illustrates a moving picture film illustrating the carrying out of my invention in one form.

By a known method of producing colored moving pictures each alternate picture section of the film is exposed to the red rays from the object, and the other picture sections are exposed to green, blue or green-violet rays from the object, and upon making a positive film from such a negative, and projecting corresponding colored rays through the different sections by means of suitable color screens a composite colored picture is produced. Such a method is described in United States Letters Patent No. 941,960, to George A. Smith, granted November 30, 1909.

It is found, however, that the red rays are less active on the sensitized photographic film than other rays, particularly the violet, so that the red color effects are not brought out accurately enough. The red colors may be more strongly brought out by decreasing the values of green and blue, but this is at the expense of the green, blue or violet colors.

In order therefore, to bring out the red more strongly I provide a film which is more sensitive at those parts which are to be exposed to red rays, while the portions which are to be exposed to other colored rays are less sensitive. In other words, I sensitize the different portions of the film in accordance with the activity of the rays to which it is to be subjected.

This may be carried out in one way, as shown in the drawing in which 1 represents a sheet of sensitized film. At RRR and RRR it is provided with strips or bands of sensitized coatings, which are extremely sensitive, especially to red rays, while at GV, GV, GV, and GV, GV, GV, it is provided with bands of sensitized coatings which are less or normally sensitive.

After this is done the sheet 1 may be cut up into film strips of the ordinary dimensions, by cutting along the lines 2, 2, so that each film strip is provided with alternate picture sections R, GV, R, GV, etc., the sections R being more sensitive than the sections GV. The strips may be perforated at 3 in any well known or suitable manner. Upon rapidly and consecutively exposing the film in a suitable camera the different sections will be substantially equally acted upon by both the red and other colored rays. And, if a positive be made and projected through a suitable color screen in a suitable manner, a composite colored picture with the red more accurately balanced with respect to the other colors, will be produced.

Although I have described my improvements in great detail and with respect to certain embodiments thereof, nevertheless I do not desire to be limited to such details except as clearly pointed out in the appended claims, since many changes and modifications may well be made without departing from the spirit and scope of my invention in its broader aspects.

Having fully and clearly described my improvements, what I claim as new and desire to secure by Letters Patent, is:

1. A photographically sensitive film having portions adapted to be exposed to red rays more sensitive than portions adapted to be exposed to other rays.

2. A photographically sensitive film divided in sections corresponding to different pictures, some of the picture sections being more sensitive than others to compensate for the difference in activity between rays of different colors.

3. Photographically sensitive film for colored pictures, said film having certain portions more sensitive than other portions to compensate for the difference in activity between rays of different colors.

4. A photographically sensitive film divided into sections for successive exposures, those sections which are adapted to be exposed to red rays being more sensitive than other portions to compensate for the difference in activity between rays of different colors.

5. A photographically sensitive film for colored pictures, divided into sections for successive exposures, the successive sections being of different sensitiveness to compensate for the difference in activity between rays of different colors.

In testimony whereof, I have signed my name to this specification, in the presence of two subscribing witnesses.

CLYDE J. COLEMAN.

Witnesses:
GORHAM CROSBY,
EDWIN SEGER.